United States Patent
Tagawa (10) Patent No.: US 11,522,380 B2
(45) Date of Patent: Dec. 6, 2022

(54) POWER STORAGE APPARATUS WITH VOLTAGE STEPPING-UP/DOWN BI-DIRECTIONAL CONVERTER

(71) Applicant: Murata Manufacturing Co., Ltd., Nagaokakyo (JP)

(72) Inventor: Shuichi Tagawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 210 days.

(21) Appl. No.: 16/823,546

(22) Filed: Mar. 19, 2020

(65) Prior Publication Data

US 2020/0220370 A1   Jul. 9, 2020

Related U.S. Application Data

(63) Continuation of application No. PCT/JP2018/030468, filed on Aug. 17, 2018.

(30) Foreign Application Priority Data

Sep. 22, 2017  (JP) .............................. JP2017-182595

(51) Int. Cl.
*H02J 7/00*  (2006.01)
*H01M 10/48*  (2006.01)
(Continued)

(52) U.S. Cl.
CPC ......... *H02J 7/00712* (2020.01); *H01M 10/44* (2013.01); *H01M 10/48* (2013.01);
(Continued)

(58) Field of Classification Search
CPC .............. H02J 7/00712; H02J 7/0049; H02J 7/007192; H02J 7/007194; H02J 7/32;
(Continued)

(56) References Cited

U.S. PATENT DOCUMENTS 4,737,702 A * 4/1988 Koenck ................. H02J 7/0071
                                                        320/152
5,477,132 A * 12/1995 Canter .................... H02J 1/102
                                                        323/282
(Continued)

FOREIGN PATENT DOCUMENTS

JP   H07115730 A   5/1995
JP   H0898414 A   4/1996
(Continued)

OTHER PUBLICATIONS

International Search Report Issued for PCT/JP2018/030468, dated Sep. 18, 2018.

(Continued)

*Primary Examiner* — John T Trischler
(74) *Attorney, Agent, or Firm* — ArentFox Schiff LLP (57) ABSTRACT

A power storage apparatus includes a storage battery chargeable and dischargeable, a voltage stepping-up/down circuit that performs a voltage stepping-up operation of stepping up by PWM control a voltage supplied from the storage battery and outputting a stepped-up voltage to a high-voltage DC bus line, and a voltage stepping-down operation of stepping down by PWM control a voltage supplied from the high-voltage DC bus line and supplying a stepped-down voltage to the storage battery. Moreover, a detection device is provided that outputs a detection signal indicating a full-charged state of the storage battery, and a controller keeps a high-side switch in the voltage stepping-up/down circuit in an off state in response to input of the detection signal.

20 Claims, 4 Drawing Sheets

(51) Int. Cl.
　　　*H02J 3/32*　　　　(2006.01)
　　　*H02J 7/35*　　　　(2006.01)
　　　*H01M 10/44*　　　(2006.01)
　　　*H02M 3/158*　　　(2006.01)
　　　*H02J 7/32*　　　　(2006.01)
(52) U.S. Cl.
　　　CPC .............. *H02J 3/32* (2013.01); *H02J 7/0049* (2020.01); *H02J 7/007192* (2020.01); *H02J 7/007194* (2020.01); *H02J 7/32* (2013.01); *H02J 7/35* (2013.01); *H02M 3/1582* (2013.01); *H02J 2207/20* (2020.01)
(58) Field of Classification Search
　　　CPC ............ H02J 7/35; H02J 3/32; H02M 3/1582; H01M 10/44; H01M 10/48
　　　USPC ....................................................... 320/101
　　　See application file for complete search history.

(56) References Cited

U.S. PATENT DOCUMENTS

| | | | | |
|---|---|---|---|---|
| 5,557,188 A * | 9/1996 | Piercey | H02J 7/00 320/134 |
| 6,118,248 A * | 9/2000 | Gartstein | H02J 7/00 320/107 |
| 6,166,527 A * | 12/2000 | Dwelley | H02M 3/1582 323/283 |
| 6,184,660 B1 * | 2/2001 | Hatular | H02J 7/022 320/141 |
| 6,674,274 B2 * | 1/2004 | Hobrecht | H02M 3/1584 323/284 |
| 6,700,214 B2 * | 3/2004 | Ulinski | H02J 7/1476 290/40 C |
| 6,700,802 B2 * | 3/2004 | Ulinski | H02J 3/32 363/37 |
| RE38,940 E * | 1/2006 | Isham | H02M 3/1588 323/283 |
| 7,522,435 B2 * | 4/2009 | Kohnotoh | H02J 7/345 363/71 |
| 7,663,345 B2 * | 2/2010 | Ozawa | H02J 7/0068 320/140 |
| 7,671,574 B1 * | 3/2010 | Burinskiy | H02M 3/1588 323/284 |
| 7,733,670 B2 * | 6/2010 | Feng | H02M 3/3378 363/17 |
| 7,809,517 B1 * | 10/2010 | Zuckerman | H03L 7/07 702/187 |
| 7,889,524 B2 * | 2/2011 | Lee | B60L 53/22 363/65 |
| 7,932,700 B2 * | 4/2011 | Cintra | H01M 6/14 320/135 |
| 7,940,016 B2 * | 5/2011 | Donnelly | B60L 7/18 318/139 |
| 7,990,119 B2 * | 8/2011 | Petty | H02M 3/156 323/273 |
| 8,053,921 B2 * | 11/2011 | Ichikawa | B60L 50/61 307/9.1 |
| 8,058,748 B2 * | 11/2011 | Kohnotoh | H02J 7/345 307/43 |
| 8,085,005 B2 * | 12/2011 | Dearn | H02M 3/1582 323/222 |
| 8,358,107 B2 * | 1/2013 | Nguyen | H02J 7/0068 320/128 |
| 8,410,634 B2 * | 4/2013 | Park | H02J 3/005 307/65 |
| 8,509,978 B2 * | 8/2013 | Kato | B60W 20/13 701/22 |
| 8,513,830 B2 * | 8/2013 | Kimura | B60L 50/40 307/10.1 |
| 8,565,953 B2 * | 10/2013 | Kato | B60L 7/14 701/22 |
| 8,571,733 B2 * | 10/2013 | Yamamoto | B60W 30/18054 701/22 |
| 8,571,734 B2 * | 10/2013 | Yamamoto | B60L 50/61 701/22 |
| 8,583,307 B2 * | 11/2013 | Kato | B60K 6/445 701/22 |
| 8,598,734 B2 * | 12/2013 | Kusumi | B60L 50/16 307/10.1 |
| 8,624,426 B2 * | 1/2014 | Kato | B60K 6/445 307/9.1 |
| 8,669,744 B1 * | 3/2014 | Vinciarelli | H02M 3/1582 323/235 |
| 8,716,891 B2 * | 5/2014 | Choi | H02J 3/383 307/71 |
| 8,723,489 B2 * | 5/2014 | Parakulam | H02M 1/08 323/259 |
| 8,793,041 B2 * | 7/2014 | Yamamoto | B60L 15/007 701/22 |
| 8,907,522 B2 * | 12/2014 | Park | H02J 3/32 307/65 |
| 8,928,287 B2 * | 1/2015 | Abe | H02J 7/0018 320/132 |
| 8,928,288 B2 * | 1/2015 | Abe | H02J 7/0018 320/134 |
| 9,018,918 B2 * | 4/2015 | Nguyen | H02J 7/00 320/138 |
| 9,083,197 B2 * | 7/2015 | Asakura | B60L 53/53 |
| 9,118,193 B2 * | 8/2015 | Yeh | H02J 7/00302 |
| 9,479,056 B2 * | 10/2016 | Parakulam | H02M 1/08 |
| 9,634,512 B1 * | 4/2017 | Kim | H02J 7/00 |
| 9,780,590 B2 * | 10/2017 | Nguyen | H02J 7/00 |
| 9,882,380 B2 * | 1/2018 | Sepe, Jr. | H02J 1/102 |
| 10,014,778 B1 * | 7/2018 | Wei | H02M 3/1582 |
| 10,033,301 B2 * | 7/2018 | Zhang | H02M 1/12 |
| 10,056,858 B2 * | 8/2018 | Pietromonaco | H02M 3/155 |
| 10,075,071 B2 * | 9/2018 | Park | G05F 1/56 |
| 10,148,195 B2 * | 12/2018 | Tagawa | H02M 7/537 |
| 10,270,275 B2 * | 4/2019 | Jezierski, Jr. | H02J 3/32 |
| 10,326,296 B2 * | 6/2019 | Pullen | H02J 7/0063 |
| 10,333,319 B2 * | 6/2019 | Sepe, Jr. | H02J 7/007194 |
| 10,374,447 B2 * | 8/2019 | Deboy | H02J 7/02 |
| 10,439,404 B2 * | 10/2019 | Shen | H02J 7/007184 |
| 10,511,234 B2 * | 12/2019 | Zhang | H02M 7/537 |
| 10,651,738 B2 * | 5/2020 | Gong | G01R 19/0092 |
| 10,700,540 B2 * | 6/2020 | Ishikura | H02J 3/32 |
| 10,771,001 B2 * | 9/2020 | Smolenaers | H02P 25/22 |
| 10,826,318 B2 * | 11/2020 | Tagawa | H02M 1/36 |
| 10,897,190 B2 * | 1/2021 | Takei | H02J 7/35 |
| 10,965,151 B2 * | 3/2021 | Shinoda | H02J 9/062 |
| 10,992,151 B2 * | 4/2021 | Nguyen | H02J 7/00 |
| 11,139,657 B2 * | 10/2021 | Nakajima | H02J 7/35 |
| 2002/0041502 A1 * | 4/2002 | Ulinksi | H02J 9/062 363/37 |
| 2002/0051368 A1 * | 5/2002 | Ulinski | H02M 5/4585 363/1 |
| 2002/0135338 A1 * | 9/2002 | Hobrecht | H02M 3/1584 323/272 |
| 2005/0052221 A1 * | 3/2005 | Kohnotoh | H02J 7/345 327/536 |
| 2006/0164041 A1 * | 7/2006 | Ooshita | H02J 7/0091 320/150 |
| 2007/0216378 A1 * | 9/2007 | Ozawa | H02J 7/0068 323/252 |
| 2008/0062724 A1 * | 3/2008 | Feng | H02J 7/35 363/17 |
| 2008/0238369 A1 * | 10/2008 | Cintra | H01M 6/14 320/128 |
| 2009/0103341 A1 * | 4/2009 | Lee | B60L 53/24 363/124 |
| 2009/0167245 A1 * | 7/2009 | Nguyen | H02J 7/00 320/128 |
| 2009/0184581 A1 * | 7/2009 | Kohnotoh | H02J 7/345 307/43 |
| 2010/0026250 A1 * | 2/2010 | Petty | H02M 3/156 323/271 |
| 2010/0065351 A1 * | 3/2010 | Ichikawa | B60L 15/025 180/65.8 |
| 2010/0320992 A1 * | 12/2010 | Dearn | H02M 3/1582 323/311 |

(56) References Cited

U.S. PATENT DOCUMENTS

| | | | |
|---|---|---|---|
| 2011/0080143 A1* | 4/2011 | Parakulam | H02M 1/32 320/162 |
| 2011/0133558 A1* | 6/2011 | Park | H02J 3/005 307/66 |
| 2011/0144822 A1* | 6/2011 | Choi | H02J 3/46 700/297 |
| 2011/0178664 A1* | 7/2011 | Yamamoto | B60K 6/445 701/22 |
| 2011/0187183 A1* | 8/2011 | Kimura | H02J 7/345 307/9.1 |
| 2011/0257825 A1* | 10/2011 | Yamamoto | B60W 10/08 701/22 |
| 2012/0010771 A1* | 1/2012 | Kato | B60W 10/26 701/22 |
| 2012/0013184 A1* | 1/2012 | Kato | B60W 10/26 307/9.1 |
| 2012/0022738 A1* | 1/2012 | Kato | B60L 58/24 701/22 |
| 2012/0032505 A1* | 2/2012 | Kusumi | B60L 58/18 307/10.1 |
| 2012/0074901 A1* | 3/2012 | Mohammed | B60L 58/15 320/109 |
| 2012/0089290 A1* | 4/2012 | Kato | B60L 58/15 701/22 |
| 2012/0169291 A1* | 7/2012 | Abe | H02J 7/0018 320/134 |
| 2012/0176091 A1* | 7/2012 | Abe | H02J 7/0026 320/132 |
| 2012/0181990 A1* | 7/2012 | Asakura | B60L 53/30 320/137 |
| 2013/0099750 A1* | 4/2013 | Nguyen | H02J 7/0068 320/128 |
| 2013/0175867 A1* | 7/2013 | Park | H02J 3/32 307/66 |
| 2014/0097790 A1* | 4/2014 | Yeh | H02J 7/00306 320/108 |
| 2014/0125299 A1* | 5/2014 | Barth | H02M 3/1584 323/266 |
| 2014/0265606 A1* | 9/2014 | Gazit | H02J 7/0018 307/82 |
| 2014/0266069 A1* | 9/2014 | Deboy | H02J 7/00712 320/149 |
| 2014/0266071 A1* | 9/2014 | Tomiyasu | H02J 7/007192 320/150 |
| 2014/0266096 A1* | 9/2014 | Parakulam | H02M 1/08 323/271 |
| 2014/0339902 A1* | 11/2014 | Sepe, Jr. | H02M 3/158 307/80 |
| 2015/0073632 A1* | 3/2015 | Hill | B60W 10/28 701/22 |
| 2015/0107824 A1* | 4/2015 | Signorelli | E21B 41/0085 166/244.1 |
| 2015/0155783 A1* | 6/2015 | Li | H02M 3/158 323/271 |
| 2015/0162776 A1* | 6/2015 | Nguyen | H02J 7/0068 307/24 |
| 2015/0188432 A1* | 7/2015 | Vannorsdel | H02M 3/156 323/271 |
| 2015/0207354 A1* | 7/2015 | Naskali | H02J 7/022 320/103 |
| 2015/0270731 A1* | 9/2015 | Adelmann | H02J 7/0003 320/101 |
| 2016/0248328 A1* | 8/2016 | Zhang | H02M 3/1584 |
| 2016/0250937 A1* | 9/2016 | Hayslett | B60L 53/80 701/22 |
| 2016/0322894 A1* | 11/2016 | Giuliano | H02M 3/07 |
| 2017/0025868 A1* | 1/2017 | Gravett | G01K 7/22 |
| 2017/0047845 A1* | 2/2017 | Parakulam | H02M 1/08 |
| 2017/0063125 A1* | 3/2017 | Jezierski, Jr. | H02J 3/32 |
| 2017/0070081 A1* | 3/2017 | Cher | H02S 40/32 |
| 2017/0070085 A1* | 3/2017 | Cher | H02J 7/34 |
| 2017/0072812 A1* | 3/2017 | Von Novak | H02J 1/10 |
| 2017/0149368 A1* | 5/2017 | Pietromonaco | H02M 3/158 |
| 2017/0155274 A1* | 6/2017 | Cher | H02J 7/34 |
| 2017/0222464 A1* | 8/2017 | Pullen | H02J 7/0068 |
| 2017/0346397 A1* | 11/2017 | Babazadeh | H02M 3/156 |
| 2018/0048230 A1* | 2/2018 | Park | H02M 3/1584 |
| 2018/0123374 A1* | 5/2018 | Nguyen | H02J 7/0068 |
| 2018/0166892 A1* | 6/2018 | Sepe, Jr. | H02J 7/345 |
| 2018/0254732 A1* | 9/2018 | Smolenaers | H02J 7/02 |
| 2018/0287390 A1* | 10/2018 | Nakajima | H02J 3/32 |
| 2018/0309389 A1* | 10/2018 | Tagawa | H02M 7/53873 |
| 2018/0351473 A1* | 12/2018 | Zhang | H02M 3/1584 |
| 2019/0006870 A1* | 1/2019 | Ishikura | H02J 3/38 |
| 2019/0113581 A1* | 4/2019 | Kawamura | G01R 31/382 |
| 2019/0173370 A1* | 6/2019 | Gong | G01R 19/0092 |
| 2020/0072178 A1* | 3/2020 | Berkson | F02N 11/0866 |
| 2020/0203985 A1* | 6/2020 | Tagawa | H01M 10/44 |
| 2020/0235664 A1* | 7/2020 | Takei | H02H 9/001 |
| 2020/0259360 A1* | 8/2020 | Tagawa | H02J 7/35 |
| 2020/0381928 A1* | 12/2020 | Isaksson | H01M 10/625 |
| 2021/0234389 A1* | 7/2021 | Nguyen | H02J 7/00 |
| 2021/0391793 A1* | 12/2021 | Peting | H02M 3/1584 |

FOREIGN PATENT DOCUMENTS

| | | |
|---|---|---|
| JP | 2002152988 A | 5/2002 |
| JP | 2005102469 A | 4/2005 |
| JP | 2007252154 A | 9/2007 |
| JP | 2010093888 A | 4/2010 |
| WO | 2017126175 A1 | 7/2017 |

OTHER PUBLICATIONS

Written Opinion of the International Searching Authority issued for PCT/JP2018/030468, dated Sep. 18, 2018.

* cited by examiner

POWER STORAGE APPARATUS WITH VOLTAGE STEPPING-UP/DOWN BI-DIRECTIONAL CONVERTER

CROSS REFERENCE TO RELATED APPLICATIONS

The present application is a continuation of PCT/JP2018/030468 filed Aug. 17, 2018, which claims priority to Japanese Patent Application No. 2017-182595, filed Sep. 22, 2017, the entire contents of each of which are incorporated herein by reference.

TECHNICAL FIELD

The present invention relates to a power storage apparatus configured to store power generated by a photovoltaic power generation system in a storage battery and to supply power stored in the storage battery to a load device.

BACKGROUND

In general household photovoltaic power generation systems, DC power generated by a photovoltaic panel is converted into a predetermined AC voltage by an inverter in a power conditioner to be supplied to a domestic load device or a power grid.

A power storage apparatus capable of storing DC power generated by a photovoltaic panel in a storage battery and supplying power stored in the storage battery to a domestic load device via a power conditioner as needed has recently been proposed.

The power storage apparatus is configured such that DC power generated by the photovoltaic panel is supplied to a high-voltage DC bus line via a PV converter in the power conditioner, is stepped down in voltage by a bidirectional converter, and is stored in the storage battery. The DC power stored in the storage battery is stepped up in voltage by the bidirectional converter and is smoothed by a smoothing capacitor to be supplied to the high-voltage DC bus line and is then converted into an AC voltage by an inverter in the power conditioner to be supplied to a domestic load device.

As described in Patent Document 1 (identified below), a charging/discharging circuit (e.g., a buck-booster converter) capable of charging a storage battery by a voltage stepping-up/down chopper or discharging the storage battery by the voltage stepping-up/down chopper is described.

Patent Document 1: Japanese Unexamined Patent Application Publication No. 7-115730.

The power storage apparatus as described above needs to accurately shut off a charging current to the storage battery after the storage battery is fully charged and needs to prevent deterioration of the storage battery due to overcharging.

Moreover, a chopper circuit generally uses a FET as a switching device for enhancing power conversion efficiency. To shut off a charging current to the storage battery by such chopper circuit after the storage battery is fully charged, the FET constituting the chopper circuit needs to be alternately switched on and switched off at equal intervals to thereby compensate for the charging and discharging currents.

However, a charging current to the storage battery is not completely shut off while the FET is PWM-controlled, and deterioration of the storage battery due to overcharging can be caused.

SUMMARY OF THE INVENTION

The present invention has been made in view of such situation and provides a power storage apparatus configured to shut off a charging current to a storage battery after the storage battery is fully charged.

Accordingly, a power storage apparatus is provided that includes a storage battery chargeable and dischargeable, a voltage stepping-up/down circuit configured to perform a voltage stepping-up operation of stepping up by PWM control a voltage supplied from the storage battery and supplying a stepped-up voltage to a high-voltage DC bus line and to perform a voltage stepping-down operation of stepping down by PWM control a voltage supplied from the high-voltage DC bus line and supplying a stepped-down voltage to the storage battery, a detection device configured to output a detection signal indicating a fully charged state of the storage battery, and a controller configured to keep a high-side switch in the voltage stepping-up/down circuit in an off state in response to input of the detection signal.

With the configuration, when the storage battery is fully charged, the high-side switch is kept in the off state and a charging current to the storage battery is shut off.

Moreover, in the power storage apparatus, the controller preferably returns an operation of the voltage stepping-up/down circuit to the voltage stepping-up operation when a command signal for requesting a stepped-up voltage to be output from the voltage stepping-up/down circuit is input from an external device while the high-side switch is kept in the off state.

With the configuration, even when the high-side switch is in the off state, a stepped-up voltage is output from the voltage stepping-up/down circuit when the command signal is input into the controller.

Furthermore, in the power storage apparatus, the controller preferably returns an operation of the voltage stepping-up/down circuit to the voltage stepping-up operation when a voltage of the high-voltage DC bus line decreases from a normal voltage while the high-side switch is kept in the off state.

With the configuration, even when the high-side switch is in the off state, a stepped-up voltage is output from the voltage stepping-up/down circuit when a voltage of the high-voltage DC bus line decreases from a normal voltage.

In an exemplary aspect of the power storage apparatus, the detection signal can include a detection signal indicating that an ambient temperature of the storage battery is outside a predetermined range.

With the configuration, the storage battery is prevented from being charged when the ambient temperature is outside the predetermined range.

In another exemplary aspect of the power storage apparatus, the external device is preferably a power conditioner configured to supply a high DC voltage to the high-voltage DC bus line in accordance with power generated by a photovoltaic panel.

With the configuration, when a voltage supplied from the power conditioner to the high-voltage DC bus line decreases, a stepped-up voltage is output from the voltage stepping-up/down circuit.

In the power storage apparatus, the voltage stepping-up/down circuit can include the high-side switch and a low-side switch connected in series between a pair of terminals of the high-voltage DC bus line and include an inductor which is connected at a first end to a node between the high-side switch and the low-side switch and is connected at a second end to one terminal of the storage battery, and it is preferable that the high-side switch and the low-side switch be constituted by a MOSFET controlled by the controller using PWM control and that the high-side switch include a body diode configured to cause a discharging current of the storage battery to flow from the inductor to the high-voltage DC bus line.

With the configuration, when the high-side switch is kept in the off state, a discharging current flows from the storage battery to the high-voltage DC bus line via the body diode of the high-side switch. When the voltage stepping-up operation is restarted in the voltage stepping-up/down circuit, a stepped-up voltage is supplied from the high-side switch to the high-voltage DC bus line.

The power storage apparatus according to the present invention enables a charging current to a storage battery to be shut off after the storage battery is fully charged.

DETAILED DESCRIPTION OF EMBODIMENTS

An exemplary embodiment of the present invention will be described below with reference to the drawings.

Figure 1:
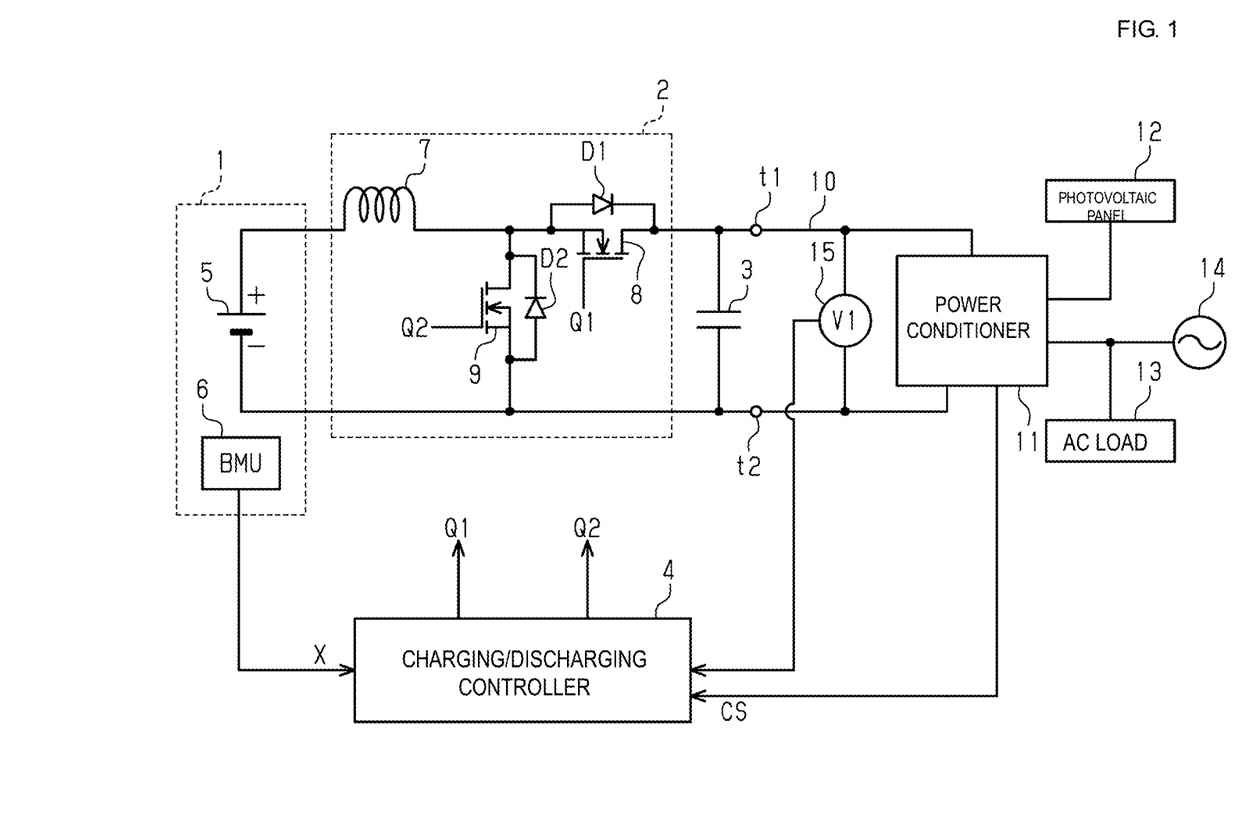
FIG. 1 is a circuit diagram of a power storage apparatus in a photovoltaic power generation system according to an exemplary embodiment.

A power storage apparatus in a photovoltaic power generation system illustrated in FIG. 1 includes a battery pack 1, a voltage stepping-up/down circuit 2, a smoothing capacitor 3, and a charging/discharging controller 4. The battery pack 1 includes a storage battery 5, and a battery management unit (BMU) 6 that is configured to manage a charging/discharging state of the storage battery 5. The BMU 6 is configured to detect a cell voltage of the storage battery 5, a state of charge (SOC), an ambient temperature of the storage battery 5, and the like and is configured to output each detection signal X to the charging/discharging controller 4. Moreover, it is noted that in exemplary embodiments, BMY 6 can include a computer processor configured to execute software code to perform the algorithms described herein. In alternative aspects, BMU 6 can be an analog/digital converter, a communication (e.g., CAN) circuit, or the like, configured to generate the signals as described herein.

The voltage stepping-up/down circuit 2 includes a coil 7 and a high-side first switch 8 and a low-side second switch 9, both of which are formed by a metal-oxide-semiconductor field-effect transistor (MOSFET), and is connected to a high-voltage DC bus line 10 via a pair of terminals t1 and t2.

The first switch 8 and the second switch 9 are connected in series between the terminals t1 and t2, and the coil 7 is connected between the node of the first switch 8 and the second switch 9 and the positive terminal of the storage battery 5. The negative terminal of the storage battery 5 is connected to the terminal t2 via the voltage stepping-up/down circuit 2.

Control signals Q1 and Q2 are input from the charging/discharging controller 4 into the gates of the first switch 8 and the second switch 9, respectively. The first switch 8 and the second switch 9 are PWM-controlled by the control signals Q1 and Q2, respectively, and are configured to perform a voltage stepping-up operation or a voltage stepping-down operation in cooperation with the coil 7.

Specifically, in the voltage stepping-up operation, an output voltage of the storage battery 5 is stepped up, for example, from 300 V to 380 V and is supplied to the high-voltage DC bus line 10. In the voltage stepping-down operation, a DC voltage supplied from the high-voltage DC bus line 10 is stepped down, for example, from 380 V to 300 V and is supplied to the storage battery 5.

A body diode D2 is present between the source and drain of the second switch 9, and a body diode D1 is present between the source and drain of the first switch 8. The body diode D2 is present with its cathode closer to the coil 7, and the body diode D1 is present with its anode closer to the coil 7.

The smoothing capacitor 3 is connected between the terminals t1 and t2 (e.g., in parallel) and smooths a stepped-up voltage output from the voltage stepping-up/down circuit 2 and outputs the smoothed stepped-up voltage to the high-voltage DC bus line 10.

A power conditioner 11 is connected to the high-voltage DC bus line 10. A photovoltaic panel 12, a domestic AC load 13, and a commercial power grid 14 are connected to the power conditioner 11 in an exemplary aspect.

DC power generated by the photovoltaic panel 12 is stepped up in voltage by a PV converter in the power conditioner 11 and is converted into commercial AC power by an inverter to be supplied to the domestic AC load 13 or the commercial power grid 14. A high DC voltage stepped up by the PV converter is supplied to the high-voltage DC bus line 10.

Figure 4:
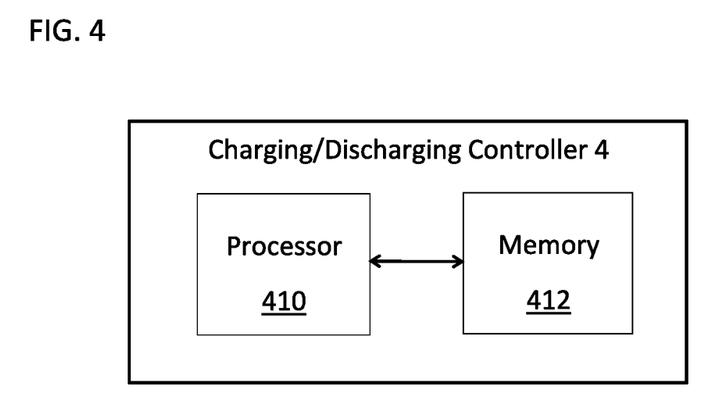
FIG. 4 illustrates an example of a charging/discharging controller according to an exemplary embodiment.

The voltage supplied to the high-voltage DC bus line 10 is detected by a voltmeter 15, and the detected voltage V1 is output to the charging/discharging controller 4. A command signal CS for requesting the charging/discharging controller 4 to supply a stepped-up voltage to the high-voltage DC bus line 10 is input from the power conditioner 11 into the charging/discharging controller 4. In an exemplary aspect, the charging/discharging controller 4 can include a computer processor (or similar processing unit) configured to execute software instructions stored on electronic memory for purposes of executing the algorithms described herein. FIG. 4 illustrates an example in which the charging/discharging controller 4 include a computer processor 410 and electronic memory 412.

For example, the charging/discharging controller 4 is configured to output the control signals Q1 and Q2 and PWM-controls the first and second switches 8 and 9 in accordance with a preset program. The voltage stepping-up/down circuit 2 steps up or down the voltage in response to the input of the control signals Q1 and Q2.

When a detection signal X is input from the BMU 6 into the charging/discharging controller 4, the first switch 8 is switched off, and a charging current to be supplied to the storage battery 5 is shut off.

When the detected voltage V1 input from the voltmeter 15 into the charging/discharging controller 4 decreases to a normal voltage of the high-voltage DC bus line 10, or to less than 380 V, for example, or when the command signal CS is input from the power conditioner 11 into the charging/discharging controller 4, the charging/discharging controller 4 causes the voltage stepping-up/down circuit 2 to perform the voltage stepping-up operation, thereby supplying a stepped-up voltage to the high-voltage DC bus line 10.

Operations of the power storage apparatus will be described below with reference to FIG. 2.

In particular, when the power storage apparatus is operated, the first and second switches 8 and 9 in the voltage stepping-up/down circuit 2 are PWM-controlled by the control signals Q1 and Q2, respectively, to be alternately driven on or driven off by the charging/discharging controller 4. Thus, the voltage stepping-up operation of stepping up the output voltage of the storage battery 5 and supplying the stepped-up voltage to the high-voltage DC bus line 10 or the voltage stepping-down operation of stepping down the high voltage supplied from the power conditioner 11 to the high-voltage DC bus line 10 and supplying the stepped-down voltage to the storage battery 5 is performed (step S1).

A determination is then made as to whether the ambient temperature of the storage battery 5 is within a predetermined temperature range, based on a detection signal X output from the BMU 6 (step S2). When the ambient temperature is within the predetermined temperature range, the process proceeds to step S3, where a determination is made as to whether the cell voltage of the storage battery 5 has reached a predetermined upper limit.

When the ambient temperature of the storage battery 5 is within the predetermined temperature range and the cell voltage has not reached the upper limit, the first and second switches 8 and 9 are continuously subjected to switching control.

When the ambient temperature of the storage battery 5 is outside the predetermined temperature range or the cell voltage has reached the upper limit, the process proceeds to step S4, where the control signal Q1 for switching off the first switch 8 is output from the charging/discharging controller 4. Consequently, a charging current is no longer supplied to the storage battery 5.

If the storage battery 5 made of, for example, a lithium ion battery is charged at an extremely low or high ambient temperature outside the predetermined temperature range, a failure may occur in the storage battery 5. In step S2, to avoid such a failure, a determination is made as to whether a charging current can be supplied to the storage battery 5 in accordance with the ambient temperature of the storage battery 5.

If the first switch 8 is kept in the off state, supplying a charging current to the storage battery 5 is stopped, but a discharging current flowing from the storage battery 5 to the smoothing capacitor 3 or the high-voltage DC bus line 10 via the coil 7 and the body diode D1 of the first switch 8 is enabled. Therefore, the SOC value of the storage battery 5 gradually decreases.

The charging/discharging controller 4 continuously determines whether the SOC value of the storage battery 5 is less than 100% in accordance with an input detection signal X while the first switch 8 is kept in the off state (steps S5 and S8).

When the SOC value is less than 100%, a determination is made as to whether the ambient temperature of the storage battery 5 is within the predetermined temperature range (step S6) as in step S2. If the ambient temperature is within the predetermined temperature range, the process proceeds to step S7 where the off state of the first switch 8 is released, and the process then returns to step S1.

In step S6, if the ambient temperature of the storage battery 5 is outside the predetermined temperature range, the first switch 8 is kept in the off state, and the process returns to step S5. Therefore, until the SOC value of the storage battery 5 reaches less than 100 and the ambient temperature of the storage battery 5 falls within the predetermined temperature range, the first switch 8 is kept in the off state.

When the detected voltage V1 of the voltmeter 15 decreases or the command signal CS is input from the power conditioner 11 while the first switch 8 is kept in the off state in step S8, the charging/discharging controller 4 restarts PWM control of the first and second switches 8 and 9 and outputs a stepped-up voltage to the high-voltage DC bus line 10.

A current flowing in the coil 7 when the storage battery 5 is charged or discharged while the power storage apparatus is being operated will be described.

In FIG. 3(a) to FIG. 3(d), a current IL flows in the coil 7 when the first and second switches 8 and 9 in the voltage stepping-up/down circuit 2 are PWM-controlled. The current IL includes a positive discharging current Id flowing from the storage battery 5 to the voltage stepping-up/down circuit 2 and a negative charging current Ic flowing from the voltage stepping-up/down circuit 2 to the coil 7.

Figure 3A:
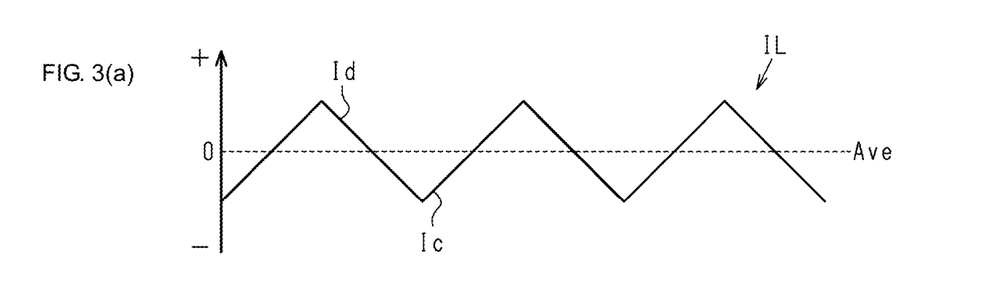
FIGS. 3(a) to 3(d) are waveform diagrams of a current flowing in a coil in a voltage stepping-up/down circuit according to an exemplary embodiment.

As illustrated in FIG. 3(a), when an average value Ave of the current IL is 0, the charging current Ic and the discharging current Id are in a balanced state. Therefore, the charging current Ic is not supplied to the storage battery 5, and the discharging current Id does not flow from the storage battery 5.

Figure 3B:
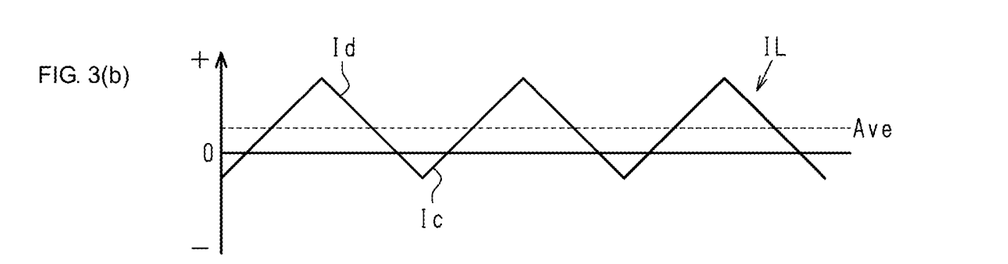

As illustrated in FIG. 3(b), when the average value Ave of the current IL is a positive value, the discharging current Id is larger than the charging current Ic, and the discharging current flows from the storage battery 5 to the voltage stepping-up/down circuit 2.

Figure 3C:
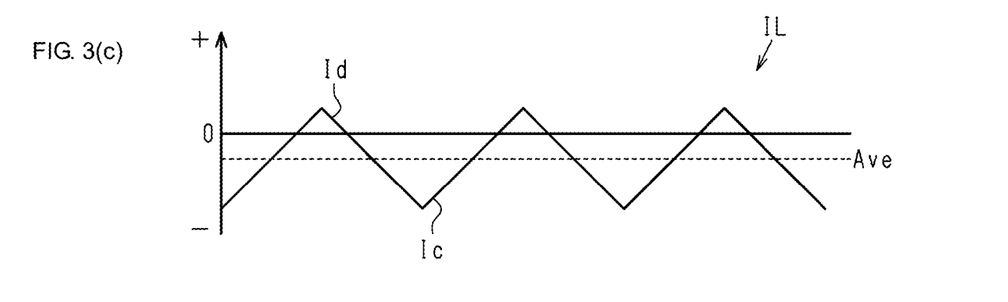

As illustrated in FIG. 3(c) of FIG. 3, when the average value Ave of the current IL is a negative value, the charging current Ic is larger than the discharging current Id, and the charging current flows from the voltage stepping-up/down circuit 2 to the storage battery 5.

In the charging state in FIG. 3(c), when the cell voltage of the storage battery 5 reaches the upper limit and the first switch 8 is switched off, the charging current Ic is shut off as illustrated in FIG. 3 (d), and the slight discharging current Id is supplied from the coil 7 to the smoothing capacitor 3 and the high-voltage DC bus line 10 via the body diode D1 of the first switch 8.

Figure 3D:
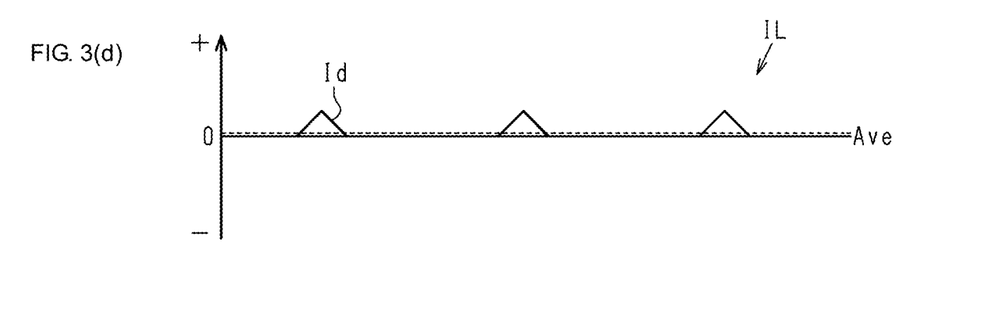

When the cell voltage of the storage battery 5 decreases from the above state and switching operation of the first switch 8 is restarted, the charging current Ic can flow as an inrush current into the storage battery 5.

Thus, as illustrated in FIG. 3 (d), switching operation of the second switch 9 is controlled so that the average value Ave of the current IL is close to 0 when the first switch 8 is in the switched off state. Under such control, when the switching operation of the first switch 8 is restarted, an inrush current is prevented from flowing into the storage battery 5.

A value of the current IL is sampled and held when the first switch 8 is switched off, and the switching operations of the first and second switches 8 and 9 can be controlled such that the charging current Ic flowing in the coil 7 is not larger than the sampled and held current value when the switching operation of the first switch 8 is restarted.

The thus-configured power storage apparatus according to the exemplary embodiments provide the following advantageous effects.

When the cell voltage of the storage battery 5 reaches the upper limit when the storage battery 5 is being charged, the first switch 8 in the voltage stepping-up/down circuit 2 is made non-conductive and a charging current to be supplied to the storage battery 5 can be shut off. Thus, deterioration of the storage battery 5 due to overcharging is prevented.

The cell voltage of the storage battery 5 is detected by the BMU 6, and the first switch 8 can be made non-conductive in accordance with the detection signal X of the BMU 6, thereby accurately suppressing the storage battery 5 from being overcharged.

A failure due to charging the storage battery 5 at an extremely low or high temperature is suppressed.

Moreover, in an exemplary aspect, the first switch 8 in the voltage stepping-up/down circuit 2 is made non-conductive, thereby accurately shutting off a charging current to be supplied to the storage battery 5.

When the voltage of the high-voltage DC bus line 10 decreases or the command signal CS from the power conditioner 11 for requesting a stepped-up voltage to be supplied to the high-voltage DC bus line 10 is output in the state where the first switch 8 is non-conductive, the first and second switches 8 and 9 can be returned to normal PWM control. Therefore, the power storage apparatus can immediately transition to the mode of discharging from the storage battery 5, that is, the voltage stepping-up mode of supplying a stepped-up voltage from the voltage stepping-up/down circuit 2 to the high-voltage DC bus line 10 in response to a decrease in the voltage of the high-voltage DC bus line 10 or input of the command signal CS from the power conditioner 11.

In the state where the first switch 8 is non-conductive, a discharging current is supplied from the storage battery 5 to the high-voltage DC bus line 10 via the coil 7 and the body diode D1 of the first switch 8. At this time, a constant forward voltage decrease is caused in the body diode D1, and thus power is consumed in accordance with a current value of the forward current. Thus, the first and second switches 8 and 9 are immediately PWM-controlled in response to a decrease in the voltage of the high-voltage DC bus line 10 or input of the command signal CS from the power conditioner 11, thereby supplying a stepped-up voltage to the high-voltage DC bus line 10 while restricting power consumption.

It is noted that the exemplary embodiment described above may be modified as follows.

Figure 2:
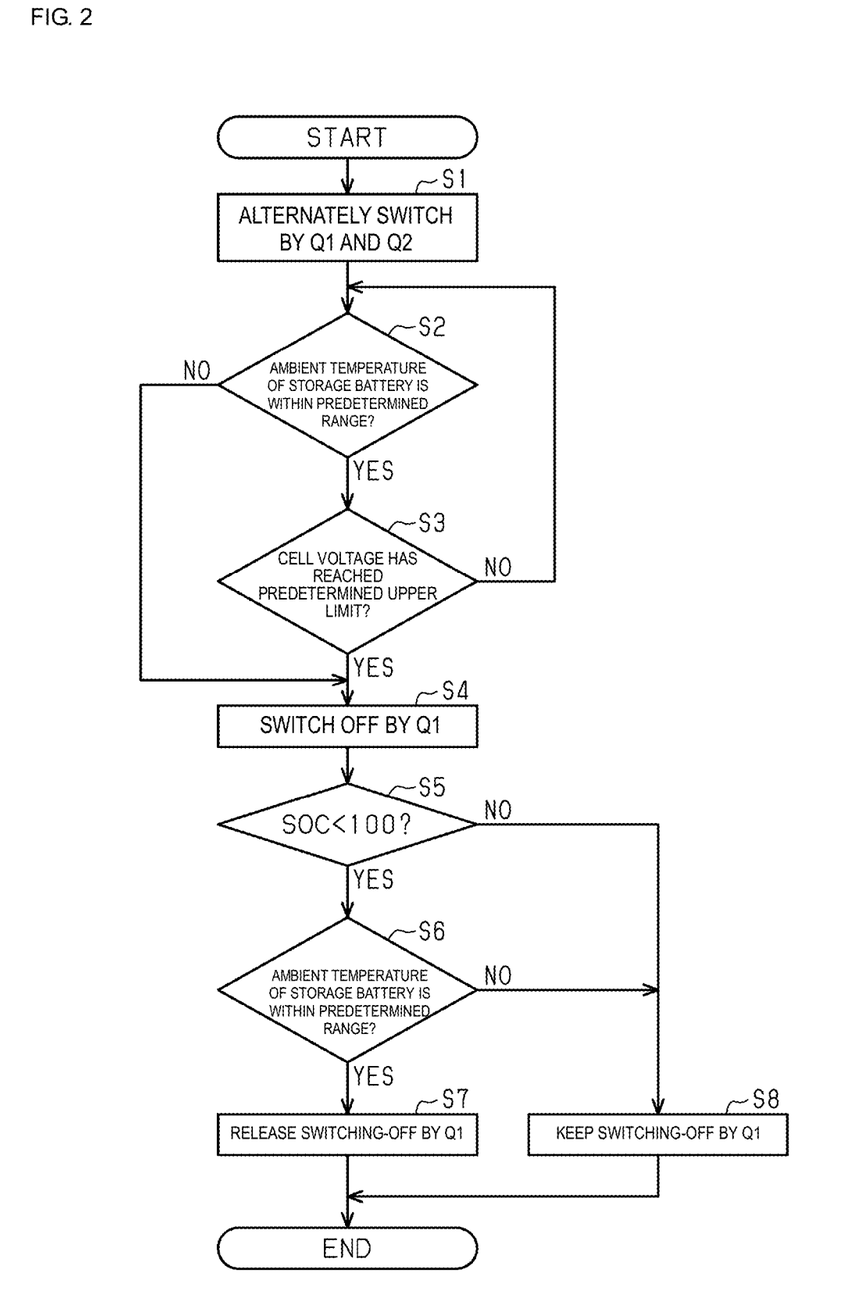
FIG. 2 is a flowchart of the operation of the power storage apparatus according to an exemplary embodiment.

In step S3 in FIG. 2, whether the SOC value has reached an upper limit may be detected.

In an exemplary aspect as noted above, the charging/discharging controller 4 may include one or more memory elements which store computer-readable instructions for realizing various control operations described in the embodiment, and one or more processors configured to execute the computer-readable instructions. Alternatively, the charging/discharging controller 4 may be an integrated circuit such as application specific IC (ASIC).

REFERENCE SIGNS LIST

2 Voltage stepping-up/down circuit
4 Controller (charging/discharging controller)
5 Storage Battery
6 Detection device (battery management unit)
7 Inductor (coil)
8 High-side switch (first switch)
9 Low-side switch (second switch)
10 High-voltage DC bus line
11 External device (power conditioner)

The invention claimed is:

1. A power storage apparatus comprising:
a storage battery that is chargeable and dischargeable;
a voltage stepping-up/down circuit configured to perform a voltage step-up by PWM control to a voltage supplied from the storage battery and to supply a stepped-up voltage to a high-voltage DC bus line, and further configured to perform a voltage step-down by PWM control to a voltage supplied from the high-voltage DC bus line and to supply a stepped-down voltage to the storage battery;
a detection device configured to output a detection signal indicating a charged state of the storage battery; and
a controller configured to maintain a high-side switch in the voltage stepping-up/down circuit in an off state when the detection signal indicates the storage battery is in a fully charged state,
wherein the voltage stepping-up/down circuit comprises:
the high-side switch and a low-side switch connected in series between a pair of terminals of the high-voltage DC bus line, with the low-side switch also connected in parallel to the storage battery; and
an inductor connected at a first end to a node between the high-side switch and the low-side switch and at a second end to one terminal of the storage battery, and
wherein, when the high-side switch is maintained in the off state, the controller is further configured to control the low-side switch such that an average value of current flowing through the inductor is close to 0.

2. The power storage apparatus according to claim 1, wherein the controller is configured to return the voltage stepping-up/down circuit to an operation of stepping-up the voltage from the storage battery when a voltage of the high-voltage DC bus line decreases while the high-side switch is in the off state.

3. The power storage apparatus according to claim 1, wherein the high-side switch and the low-side switch comprise MOSFETs controlled by the controller using the PWM control, and the high-side switch comprises a body diode configured to cause a discharging current of the storage battery to flow from the inductor to the high-voltage DC bus line.

4. The power storage apparatus according to claim 1, wherein the controller comprises a processor configured to execute software instructions stored on electronic memory for maintaining the high-side switch in the voltage stepping-up/down circuit in the off state when the detection signal indicates the storage battery is in the fully charged state.

5. The power storage apparatus according to claim 1, wherein, the controller is further configured to sample and hold a current flowing through the inductor when the high-side switch is turned to the off state, and the voltage stepping-up/down circuit is configured to perform a PWM control when the high-side switch is restarted, such that the current flowing through the inductor is not larger than a value of the current that is sampled and held by the controller.

6. The power storage apparatus according to claim 1, wherein the controller is configured to return the voltage stepping-up/down circuit to an operation of stepping-up the voltage from the storage battery when a command signal for requesting a stepped-up voltage is received from an external device while the high-side switch is in the off state.

7. The power storage apparatus according to claim 6, wherein the external device is a power conditioner configured to supply a high DC voltage to the high-voltage DC bus line based on power generated by a photovoltaic panel.

8. The power storage apparatus according to claim 1, wherein the detection signal indicates that an ambient temperature of the storage battery is outside a predetermined range.

9. The power storage apparatus according to claim 8, wherein the controller is configured to maintain the high-side switch in the off state when the ambient temperature of the storage battery is outside the predetermined range.

10. A power storage apparatus comprising:
a storage battery configured to be charged and discharged;
a voltage stepping-up/down circuit including a high-side switch and a low-side switch that are connected in series between a pair of terminals of a high-voltage DC bus line, with voltage stepping-up/down circuit configured to step-up a voltage received from the storage battery to supply a stepped-up voltage to the high-voltage DC bus line, and to perform a voltage step-down of a voltage received from the high-voltage DC bus line to supply a stepped-down voltage to the storage battery;
a detection device configured to output a detection signal indicating a charged state of the storage battery;
a controller configured to perform PWM control over the high-side switch and the low-side switch; and
an inductor connected at a first end to a node between the high-side switch and the low-side switch and connected at a second end to one terminal of the storage battery,
wherein the high-side switch comprises a body diode configured to cause a discharging current of the storage battery to flow from the inductor to the high-voltage DC bus line, and
wherein the controller configured to maintain the high-side switch in an off state based on the detection signal in order to control the low-side switch so as to discharge current via the body diode of the high-side switch,
wherein the low-side switch is connected in parallel to the storage battery, and
wherein, when the high-side switch is maintained in the off state, the controller is further configured to control the low-side switch such that an average value of current flowing through the inductor is close to 0.

11. The power storage apparatus according to claim 10, wherein the high-side switch and the low-side switch each comprise MOSFETs.

12. The power storage apparatus according to claim 10, wherein the controller is configured to return the voltage stepping-up/down circuit to an operation of stepping-up the voltage from the storage battery when a voltage of the high-voltage DC bus line decreases while the high-side switch is in the off state.

13. The power storage apparatus according to claim 10, wherein the controller comprises a processor configured to execute software instructions stored on electronic memory for maintaining the high-side switch in the voltage stepping-up/down circuit in the off state when the detection signal indicates the storage battery is in the fully charged state.

14. The power storage apparatus according to claim 10, wherein the controller is configured to return the voltage stepping-up/down circuit to an operation of stepping-up the voltage from the storage battery when a command signal for requesting a stepped-up voltage is received from an external device while the high-side switch is in the off state.

15. The power storage apparatus according to claim 14, wherein the external device is a power conditioner configured to supply a high DC voltage to the high-voltage DC bus line based on power generated by a photovoltaic panel.

16. The power storage apparatus according to claim 10, wherein the detection signal indicates that an ambient temperature of the storage battery is outside a predetermined range.

17. The power storage apparatus according to claim 16, wherein the controller is configured to maintain the high-side switch in the off state when the ambient temperature of the storage battery is outside the predetermined range.

18. A power storage method comprising:
performing, by a voltage stepping-up/down circuit having a high-side switch and a low-side switch connected in series between a pair of terminals of a high-voltage DC bus line, a voltage step-up by PWM control to a voltage supplied from a storage battery and supplying a stepped-up voltage to the high-voltage DC bus line;
performing, by the voltage stepping-up/down circuit, a voltage step-down by PWM control to a voltage supplied from the high-voltage DC bus line and supplying a stepped-down voltage to the storage battery that is connected in parallel to the low-side switch;
outputting, by a detection device, a detection signal indicating a charged state of the storage battery;
maintaining, by a controller, a high-side switch in the voltage stepping-up/down circuit in an off state when the detection signal indicates the storage battery is in a fully charged state; and
controlling the low-side switch such that an average value of current flowing through an inductor connected between the storage battery and the high-side and low-side switches is close to 0 when the high-side switch is maintained in the off state.

19. The power storage method according to claim 18, further comprising returning, by the controller, the voltage stepping-up/down circuit to an operation of stepping-up the voltage from the storage battery when a command signal for requesting a stepped-up voltage is received from an external device while the high-side switch is in the off state.

20. The power storage method according to claim 18, further comprising returning, by the controller, the voltage stepping-up/down circuit to an operation of stepping-up the voltage from the storage battery when a voltage of the high-voltage DC bus line decreases while the high-side switch is in the off state.

* * * * *